Figure 1:
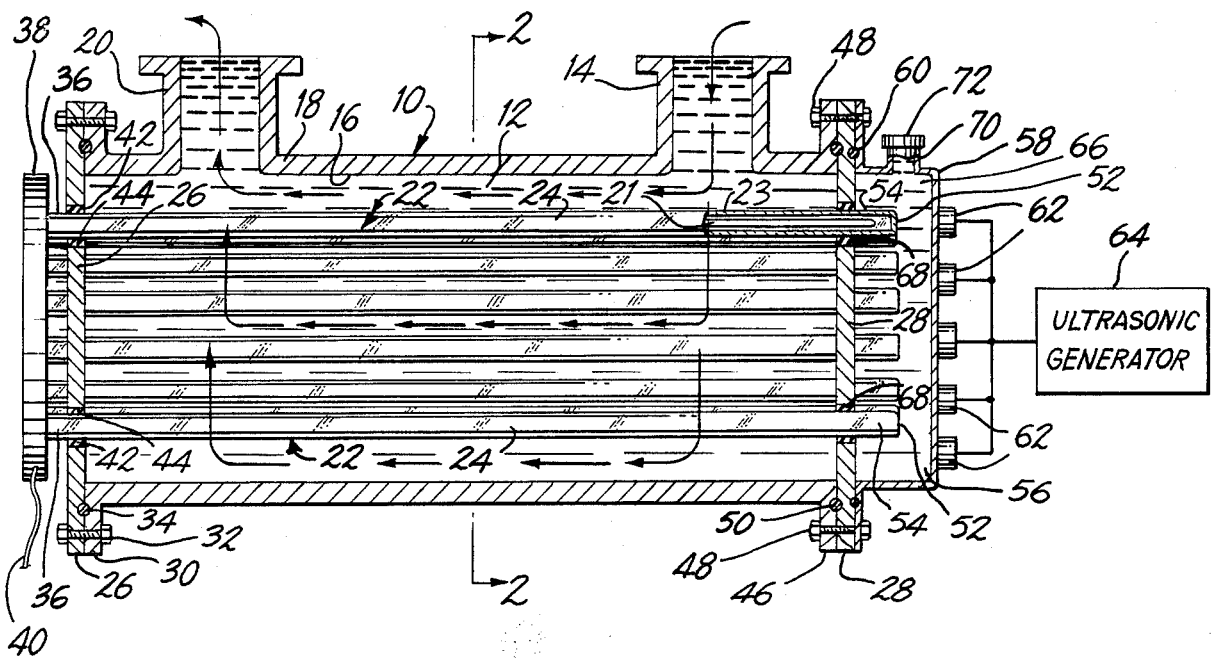

United States Patent [19]

Pedziwiatr

[11] Patent Number: 4,728,368

[45] Date of Patent: Mar. 1, 1988

[54] ULTRASONIC CLEANING IN LIQUID PURIFICATION SYSTEMS

[76] Inventor: Edward A. Pedziwiatr, 50 Glenview Ter., Cresskill, N.J. 07626

[21] Appl. No.: 856,166

[22] Filed: Apr. 25, 1986

[51] Int. Cl.⁴ ............................. C04F 1/32; C04F 1/36
[52] U.S. Cl. ........................................ 134/1; 134/184; 210/748; 210/198.1; 422/20; 422/24; 250/431
[58] Field of Search ...................... 210/748, 243, 198.1; 68/355; 134/1, 184, 22.11; 422/20, 24; 366/127; 250/423 R, 436, 431

[56] References Cited

U.S. PATENT DOCUMENTS

| | | | |
|---|---|---|---|
| 2,738,427 | 3/1956 | Wagnon | 250/431 |
| 3,061,721 | 10/1962 | Brenner | 250/431 |
| 3,672,823 | 6/1972 | Boucher | 422/24 |
| 3,700,937 | 10/1972 | Rissolo | 366/127 |
| 3,814,680 | 6/1974 | Wood | 422/24 |
| 4,013,552 | 3/1977 | Kreuter | 210/748 |
| 4,320,528 | 3/1982 | Scharton | 134/1 |
| 4,391,672 | 7/1983 | Lehtinen | 134/1 |
| 4,543,130 | 9/1985 | Shwartzman | 134/184 |

Primary Examiner—Peter Hruskoci
Assistant Examiner—Coreen Y. Lee
Attorney, Agent, or Firm—Samuelson & Jacob

[57] ABSTRACT

Cleaning apparatus and method for use in cleaning ultraviolet radiation inhibiting deposits from the active surfaces of ultraviolet radiation emitting devices utilized in liquid purification systems by inducing ultrasonic vibrations in the emitting devices with ultrasonic transducers coupled to portions of the emitting devices extending outside the conduit through which the liquid to be purified is passed, the coupling being accomplished through a coupling liquid contained within a chamber of relatively small volume into which the extending portions of the emitting devices project to be immersed in the coupling liquid.

17 Claims, 2 Drawing Figures

ULTRASONIC CLEANING IN LIQUID PURIFICATION SYSTEMS

The present invention relates generally to liquid purification systems and pertains, more specifically, to cleaning apparatus and method for use in cleaning unwanted deposits from the active surfaces of ultraviolet radiation devices employed in such purification systems.

Liquid purification systems, such as those used in the treatment of waste water, often utilize ultraviolet radiation devices for irradiating the waste water as a final step in the purification procedure. The waste water is passed through a conduit and an array of ultraviolet radiation devices, such as tubular glass ultraviolet lamps, are located in the conduit so that the waste water passes over the ultraviolet lamps and is exposed to ultraviolet radiation for final purification purposes. Since the waste water carries with it a certain amount of residual matter such as sediment, sludge and like particulate materials, deposits will form on the surfaces contacted by the waste water, including the active surfaces of the ultraviolet radiation devices. These deposits will build up and inhibit radiation from the active surfaces, thereby rendering the ultraviolet devices less and less effective as a part of the complete purification process. Consequently, it becomes necessary to clean the active surfaces in order to maintain effectiveness.

It has been suggested that ultrasonic cleaning be utilized for cleaning the active surfaces of the ultraviolet devices employed in the aforementioned liquid purification systems. Attempts to induce ultrasonic vibrations within the waste water passing across the ultraviolet radiation devices in an effort to clean the active surfaces of the devices by ultrasonic means have been largely unsuccessful since the high volume, the composition and the high volumetric flow rate of the waste water do not permit effective operation of the mechanism by which ultrasonic cleaning is accomplished. In short, it is not plausible to induce within the high volume of waste water or within the rapidly moving waste water the ultrasonic vibrations necessary to effect cleaning of the active surfaces of the ultraviolet radiation devices placed within the waste water.

The present invention avoids the necessity for inducing ultrasonic vibrations through the waste water in order to achieve ultrasonic cleaning of the active surfaces of the ultraviolet radiation devices and enables ultrasonic cleaning of these active surfaces, either continuously or intermittently during operation of the purification process, by providing a separate chamber into which portions of the ultraviolet radiation devices project and within which an ultrasonic coupling fluid is placed so that ultrasonic vibrations can be induced in the ultraviolet radiation devices themselves, through the coupling fluid, thereby accomplishing the desired ultrasonic cleaning of the active surfaces of the ultraviolet radiation devices.

It is an object of the present invention to enable ultrasonic cleaning of the active surfaces of ultraviolet radiation devices employed in liquid purification systems with effectiveness and efficiency.

Another object of the invention is to enable ultrasonic cleaning of the aforesaid active surfaces without requiring dismantling of the liquid purification system to accomplish effective cleaning.

Still another object of the invention is to enable ultrasonic cleaning of the aforesaid active surfaces while the liquid purification system remains in operation.

Yet another object of the invention is to enable ultrasonic cleaning of the aforesaid active surfaces without requiring major modifications to existing liquid purification systems in order to realize the advantages of efficient, effective cleaning.

A further object of the invention is to enable ultrasonic cleaning of the aforesaid active surfaces economically and with increased ease of operation.

The above objects, as well as still further objects and advantages, are attained by the present invention which may be described briefly as apparatus and method for use in connection with a liquid purification system of the type in which the liquid to be purified is passed through a conduit and at least one ultraviolet radiation emitting device extends into the conduit so as to provide active surfaces from which ultraviolet radiation will emanate to purify the liquid passed through the conduit, a portion of the emitting device extending outside the conduit, the apparatus and method comprising: means for and the step of generating ultrasonic vibrations; and means for and the step of coupling the ultrasonic vibrations with the portion of the emitting device extending outside the conduit so as to induce ultrasonic vibrations in the emitting device and effect the cleaning of unwanted ultraviolet radiation inhibiting deposits from the active surfaces.

Figure 2:
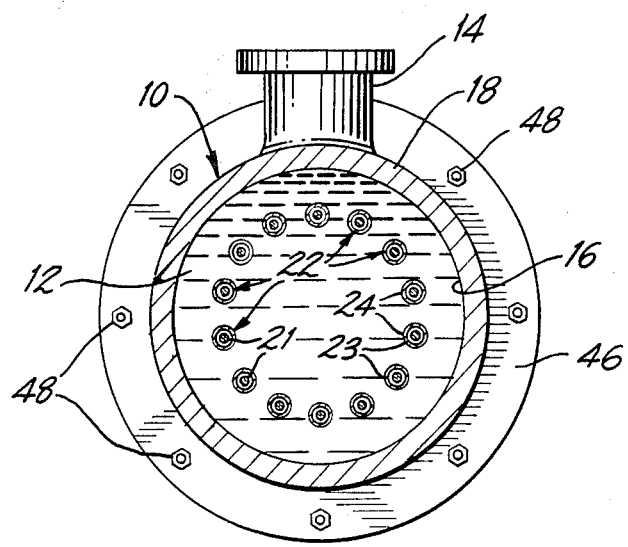

The invention will be understood more fully, while still further objects and advantages will become apparent, in the following detailed description of an embodiment thereof illustrated in the accompanying drawing, in which:

FIG. 1 is a longitudinal cross-sectional view of a portion of a liquid purification system illustrating, partially diagrammatically, the use of ultrasonic cleaning in accordance with the present invention; and FIG. 2 is a cross-sectional view taken along line 2—2 of FIG. 1.

Referring now to the drawing, a liquid purification apparatus 10 is a part of a more extensive liquid purification system and serves to accomplish one more purification step in the entire purification procedure, the step usually being the final one in a series of purification steps accomplished by the system. Liquid to be purified, here shown in the form of treated waste water 12, is introduced to apparatus 10 at an inlet 14 and enters a conduit 16 within a generally cylindrical casing 18. Waste water 12 travels downstream within the conduit 16, in the direction of the arrows in FIG. 1, to an outlet 20 where the waste water 12 is discharged.

A plurality of ultraviolet radiation emitting devices 22, shown in the form of an array of electrically-operated ultraviolet radiation emitting lamps 21 placed within glass tubes 23, extend axially within conduit 16 and include active surfaces 24 immersed within the waste water 12 so that as the waste water 12 flows through conduit 16, the waste water 12 will be exposed to ultraviolet radiation which will further purify the waste water 12 before discharge through outlet 20. In this instance, there are fourteen emitting devices 22 arranged in a circular array; however, other numbers arranged in other configurations are possible. The emitting devices 22 are held in place by a downstream end plate 26 and an upstream end plate 28.

Downstream end plate 26 is secured to a downstream flange 30 of casing 18 by suitable fastener elements 32, and a seal 34 completes the integrity of the closure provided by end plate 26. Each emitting device 22 passes through end plate 26 and presents a first end 36 projecting outside conduit 16 to be engaged by an electrical connector 38 for providing the emitting devices 22 with electrical power from an electric line 40. Seals 42 seal the passages 44 through which the emitting devices 22 pass so as to maintain the integrity of conduit 16.

Upstream end plate 28 is secured to an upstream flange 46 of casing 18 by further fastener elements 48, and a seal 50 is placed along the joint between the end plate 28 and flange 46. Each emitting device 22 passes through end plate 28 which thereby supports the emitting devices adjacent a second end 52 of each emitting device 22. Thus, the array of emitting devices 22 is held in place within the conduit 16 so that waste water 12 will be exposed to ultraviolet radiation emanating from active surfaces 24 as the waste water 12 flows through conduit 16 as a step in the purifying process.

However, waste water 12 carries a certain amount of residual matter, such as sludge, sediment and other solid and semi-solid materials, which materials tend to become deposited upon the active surfaces 24 of emitting devices 22. These unwanted deposits will build up and inhibit the passage of ultraviolet radiation from the active surfaces 24 into the flowing waste water 12, thereby reducing the effectiveness of the ultraviolet radiation in purifying the waste water 12 in conduit 16. Hence, for maximum effectiveness and efficiency, active surfaces 24 must be cleaned. It has been suggested that ultrasonic cleaning could be utilized by arranging ultrasonic transducers along casing 18 to induce ultrasonic vibrations within waste water 12 in conduit 16, thereby effecting ultrasonic cleaning of the active surfaces 24. However, the relatively high volume of waste water in conduit 16, and the high flow rate of the waste water, together with the composition of the waste water, do not permit the ultrasonic cleaning mechanism to be established effectively in that manner.

The present invention overcomes the above-outlined difficulty and enables effective ultrasonic cleaning in a practical and efficient manner. Thus, the second end 52 of each emitting device 22 extends beyond end plate 28, glass tube 23 being closed at end 52 and providing a portion 54 projecting beyond the upstream end plate 28. The projecting portion 54 of each emitting device 22 thus lies outside the high volume of waste water 12 and outside the rapidly flowing stream of waste water 12 and is available for coupling to ultrasonic transducers so that ultrasonic vibrations will be transmitted to the active surfaces 24 of the emitting devices 22, for effective ultrasonic cleaning of the active surfaces 24. Such coupling is accomplished by providing a chamber 56 adjacent the conduit 16 and located to receive therein the projecting portions 54 of the emitting devices 22. A housing 58 has a somewhat thinner wall than casing 18 and is affixed to upstream flange 46, along with upstream end plate 28, by fastener elements 48 and a seal 60 closes the chamber 56. A plurality of ultrasonic transducers 62 is affixed to the external surface of housing 58 and an ultrasonic generator 64 is connected to the transducers 62. Chamber 56 is filled with an ultrasonic coupling fluid 66 such that ultrasonic vibrations produced by the transducers 62 will induce ultrasonic vibrations in the emitting devices 22 for cleaning the active surfaces 24. Since the coupling fluid 66 is isolated from the waste water 12, by the separating wall provided by end plate 28, an adequate ultrasonic cleaning mechanism readily is established within chamber 56 and is transmitted along the length of each emitting device 22 to accomplish effective and efficient ultrasonic cleaning of active surfaces 24. The volume of chamber 56, and the coupling fluid 66 therein, is considerably less than the volume of conduit 16, and the waste water 12 therein, so that coupling fluid 66 is excited much more readily for the establishment of an effective ultrasonic cleaning mechanism. Seals 68 aid in maintaining the isolation of chamber 56 from conduit 16, without defeating effective operation of the ultrasonic cleaning mechanism.

Coupling fluid 66 preferably is a liquid medium supplied to chamber 56 through a filler neck 70, which is capped by cap 72, so that chamber 56 is maintained filled with the liquid coupling fluid 66. Suitable coupling fluids are known in the art of ultrasonic cleaning. some examples of suitable coupling fluids are mixtures of water and detergents, or chlorinated or fluorinated liquids. Ultrasonic generator 64 preferably is operated intermittently during the waste water treatment process so as to maintain the active surfaces 24 clean, such intermittent operation being under the control of a timer or by condition sensing devices in the waste water stream or in conduit 16 itself. Ultrasonic cleaning may be accomplished either while waste water 12 is flowing through conduit 16 or during periods where the liquid purification system is operated to stop the flow of waste water 12, on an intermittent basis, such that conduit 16 is filled with stationary waste water 12 during a cleaning cycle. In a typical arrangement, conduit 16 has a diameter of about two feet, the axial length between end plates 26 and 28 is about five feet, the axial length of chamber 56 is about five inches, and projecting portions 54 extend about two to three inches into chamber 56. The tubular glass construction of emitting devices 22 enables the emitting devices to be coupled readily by coupling fluid 66 for ultrasonic cleaning of the active surfaces 24. Ultrasonic frequencies in the range of twenty to eighty kilohertz accomplish such cleaning readily. Since the volume of chamber 56 is relatively small, the power required to establish an effective ultrasonic cleaning mechanism is substantially lower than that which would be required if transducers were to be employed directly in connection with conduit 16 and the volume of waste water 12 therein.

It is to be understood that the above detailed description of a preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. In a liquid purification system of the type in which the liquid to be purified is passed through a conduit and at least one ultraviolet radiation emitting device extends into the conduit so as to provide active surfaces from which ultraviolet radiation will emanate to purify the liquid passed through the conduit, the improvement comprising:

means for extending a portion of the emitting device outside the conduit such that said portion is essentially isolated from the liquid in the conduit;
    ultrasonic means for generating ultrasonic vibrations; and coupling means for coupling the ultrasonic means with the portion of the emitting device extending outside the conduit so as to induce ultrasonic vibrations in the emitting device and effect the cleaning of unwanted ultraviolet radiation inhibiting deposits from the active surfaces.

2. The invention of claim 1 wherein:

the coupling means includes a chamber located outside the conduit, said portion of the emitting device extending into the chamber, and a coupling liquid in the chamber and in contact with said portion of the emitting device; and the ultrasonic means includes ultrasonic transducers associated with said chamber such that ultrasonic vibrations will be induced in the emitting device through said coupling liquid.

3. The invention of claim 2 wherein the chamber has a volume substantially less than the volume of the conduit.

4. The invention of claim 3 including a housing within which the chamber is located, the ultrasonic transducers being located on the housing, outside the chamber.

5. A cleaning apparatus for use in connection with a liquid purification system of the type in which the liquid to be purified is passed through a conduit and a plurality of ultraviolet radiation emitting devices extend into the conduit to provide active surfaces from which ultraviolet radiation will emanate to purify the liquid passed through the conduit, the emitting devices each including a portion extending outside the conduit, the cleaning apparatus being effective to clean ultraviolet radiation inhibiting deposits from the active surfaces, said cleaning apparatus comprising:

means for extending a portion of each of the emitting devices outside the conduit such that said portion is essentially isolated from the liquid in the conduit a chamber for location adjacent the conduit such that said portions of the emitting devices extending outside the conduit will extend into the chamber;

ultrasonic means associated with the chamber for generating ultrasonic vibrations; and an ultrasonic coupling liquid in the chamber in contact with said portions of the emitting devices such that ultrasonic vibrations are induced in the emitting devices, through the coupling liquid, for cleaning said deposits from the active surfaces.

6. The invention of claim 5 wherein the chamber has a volume substantially less than the volume of the conduit, and the ultrasonic means includes a plurality of ultrasonic transducers associated with the chamber.

7. The invention of claim 6 including isolating means for essentially isolating the chamber from the conduit.

8. The invention of claim 5 wherein:

the conduit is generally tubular and extends axially between opposite ends;

a transverse wall closes the conduit adjacent one of the opposite ends;

the active surfaces of the emitting devices extend generally axially within the conduit and the emitting devices pass through the transverse wall so that the portions extending outside the conduit project beyond the transverse wall; and the location of the chamber is adjacent the transverse wall for receiving the projecting portions of the emitting devices therein.

9. The invention of claim 8 wherein the chamber has a volume substantially less than the volume of the conduit, and the ultrasonic means includes a plurality of ultrasonic transducers associated with the chamber.

10. The invention of claim 9 wherein the chamber includes a chamber wall having internal and external surfaces, and the ultrasonic transducers are affixed to the external surface of the chamber wall.

11. The invention of claim 10 wherein the emitting devices include tubular glass portions and the active surfaces are on the tubular glass portions.

12. The invention of claim 11 wherein the projecting portions of the emitting devices are on the tubular glass portions.

13. The invention of claim 12 including seals between the emitting devices and the transverse wall for isolating the chamber from the conduit and consequently isolating the liquid to be purified from the ultrasonic coupling liquid.

14. The method of cleaning ultraviolet radiation inhibiting deposits from the active surfaces of an ultraviolet radiation emitting device extending within a conduit of a liquid purification system such that ultraviolet radiation will emanate from the active surfaces to purify liquid passed through the conduit, the emitting device including a portion extending outside the conduit, said method comprising:

providing ultrasonic vibrations; and coupling the ultrasonic vibrations with the portion of the emitting device extending outside the conduit such that said portion is essentially isolated from the liquid in the conduit to induce ultrasonic vibrations in the emitting device for cleaning the deposits from the active surfaces.

15. The invention of claim 14 including immersing the portion of the emitting device extending outside of the conduit within an ultrasonic coupling liquid and inducing ultrasonic vibrations in said coupling liquid to induce said ultrasonic vibrations in the emitting device.

16. The invention of claim 15 including essentially isolating the coupling liquid from the liquid passed through the conduit.

17. The invention of claim 16 wherein the coupling liquid is a liquid has a volume substantially less than the volume of the liquid in the conduit.

* * * * *